Patented Dec. 27, 1949

2,492,524

UNITED STATES PATENT OFFICE 2,492,524

MANUFACTURE OF CELLULOSE ETHERS

Robert B. Darling, Hopewell, Va., assignor to Hercules Powder Company, Wilmington, Del., a corporation of Delaware No Drawing. Application September 18, 1945, Serial No. 617,165

8 Claims. (Cl. 260—231)

This invention relates to the manufacture of cellulose ethers and, more particularly, to the viscosity control of said ethers during their manufacture.

The reaction conditions employed when manufacturing cellulose ethers are usually so adjusted as to give ethers having a desired alkoxyl content. The factors involved include viscosity of the cellulose, ratio of reactants, method of aging the alkali cellulose, time of etherification, and temperature of etherification during the various stages of the reaction. The viscosity of cellulose ethers has been largely determined by aftertreatments or by such pretreatments as acid hydrolysis of the cellulose. However, the viscosity of the product has been subject to wide variations from intended values, due to lack of effective methods for control. Also, pretreatments or aftertreatments add one or more extra steps to the process, thus requiring extra time and incurring extra manufacturing costs.

Now, in accordance with this invention, it has been found that precise predetermination of the viscosity of cellulose ethers may be obtained by etherifying cellulose in a closed vessel, substantially eliminating all oxygen from the etherification vessel, and subsequently adding a measured amount of oxygen, as well as the usual etherification reaction ingredients such as etherifying agent and caustic, the amount of oxygen being adjusted to convert the cellulose ether which is being made to one having a desired viscosity.

The oxygen may be eliminated by displacement or other means as more particularly described hereinafter. Ordinarily, the usual oxidizing gas which is subsequently added is air, but this may contain other oxidizing substances, such as additional oxygen.

Following are examples of practical applications of this invention:

Example 1

One part cotton linters and 13 parts aqueous sodium hydroxide solution were added to an autoclave. The sodium hydroxide solution contained 50% by weight of sodium hydroxide. 4.5 parts ethyl chloride was added and 0.2 part of the same was then distilled off. Substantially no oxygen remained in the autoclave after this distillation. Air, corresponding to 0.057 cubic foot at standard temperature and pressure per pound of linters, was then introduced by displacement from a graduated tank with water. Etherification was carried out by gradual heating over a 12-hour period, reaching a maximum temperature of 150° C. Excess ethyl chloride, byproduct ether, and alcohol were then distilled off to precipitate the product. After water-washing, the ethyl cellulose was dried in vacuum. It had an ethoxyl content of 47.5% and a viscosity of 393 centipoises.

Example 2

The procedure given in the preceding example was repeated, using 0.218 cubic foot air per pound of cellulose. The air was measured by noting the rise in pressure in the autoclave. The etherification and purification of the product were carried out as described in Example 1. A product having 48.7% ethoxyl and 125 centipoises viscosity was obtained.

Example 3

One part cotton linters and 13 parts 50% aqueous sodium hydroxide were placed in an autoclave. The autoclave was substantially completely evacuated by means of a steam jet. 4.3 parts ethyl chloride was added, after which 0.228 cubic foot air per pound of cellulose was introduced. The etherification and purification of the product were carried out as described in Example 1. The product obtained had an ethoxyl content of 47.1% and a viscosity of 105 centipoises.

Example 4

One part cotton linters, 13 parts 50% aqueous sodium hydroxide, and 0.1 part ethyl chloride were placed in an autoclave. The ethyl chloride was distilled off, removing therewith substantially all the air in the autoclave. 4.3 parts ethyl chloride was added, in addition to 0.268 cubic foot air per pound of cellulose, after which esterification and purification were carried out as described in Example 1. The product had an ethoxyl content of 48.3% and a viscosity of 75 centipoises.

Example 5

One part cotton linters, 13 parts 50% aqueous sodium hydroxide, and 0.5 part diethyl ether were placed in an autoclave. The diethyl ether was distilled off, carrying with it substantially all the air in the autoclave. 0.1 cubic foot air per pound of cellulose and 0.01 cubic foot ozone per pound of cellulose were added to the autoclave. After ½ hours, 4.5 parts ethyl chloride was added. Etherification and purification were carried out as described in Example 1. The product obtained was substantially identical with that obtained in Example 4.

Thus, according to the above examples, this invention provides a method of obtaining a product of a desired viscosity by elimination of all initial air from the autoclave and then etherifying in the presence of an accurately measured amount of gaseous oxygen determined by the viscosity desired. Results of the use of the invention, as detailed in Examples 1–4 are summarized in the table below:

| Example | Cu. Ft. Air/lb. Cellulose | Viscosity of Product |
| --- | --- | --- |
| 1 | .057 | 393 |
| 2 | .218 | 125 |
| 3 | .228 | 105 |
| 4 | .268 | 75 |

By plotting the viscosity against the cubic foot of air per pound of cellulose on a semilogarithm graph, a straight line is obtained.

Numerous means for removing the air from the autoclave may be used. As shown by Example 1, a slight excess of etherifying agent may be added along with the quantity required for the etherification. This small excess is vaporized and distilled out of the autoclave, simultaneously sweeping out the air contained therein. Substantially all the air is removed by such a method. While the amount of distillation necessary for complete air removal is not critical, amounts of distilled etherifying agent usually vary from about 0.03 to about 0.8 part per part of cellulose, although higher proportions of etherifying agent may be distilled.

As shown by Example 4, this means of air removal may be varied by initially admitting to the autoclave only such quantities of the etherifying agent as will be required for distillation to completely remove the air in the autoclave. Subsequent to distillation, the quantity of etherifying agent to be utilized for etherification may be added if such prior addition is employed.

Example 5 presents a third means of removing; namely, by distilling off a volatile substantially inert solvent or diluent such as a hydrocarbon, ether, or alcohol. Such are commonly employed in cellulose etherification to promote greater product uniformity and manipulation of the reaction mass or the product. Some currently employed processes call for an excess of etherifying agent to act as diluent and solvent, while others employ benzene, ethyl ether, or isopropyl alcohol, for example, as either diluent or solvent, or for both purposes. In this instance, the small amount of volatile liquid to be distilled may be added in the amount planned for distillation or may be added as part of the larger volume of diluent or solvent.

A fourth means of removing the air from the autoclave is shown in Example 3, wherein the autoclave is evacuated by means of a steam jet. Other means of evacuating the autoclave which are equally effective include removing the air from the autoclave by means of a vacuum pump.

Other means of removing the air present in the autoclave have been found to be satisfactory. For example, displacing the air with an inert gas, such as nitrogen, accomplishes the desired result.

Having eliminated all air from the autoclave, the second part of the invention comprises adding thereto accurately determined amounts of oxidizing gases. The oxidizing gases contemplated are those containing oxygen. These include oxygen, air, and ozone as examples. The most common gas within this group to be used in carrying out this invention is air. Mixtures of the gases may be employed, as illustrated in Example 5, wherein ozone is diluted with air. The oxidizing gas may be diluted with one of less oxidizing power or with an inert gas. Air is an example of the latter combination since it contains about 80% inert gases. Example 5 is an illustration of diluting an extremely active oxidizing agent, ozone, with one of lesser activity, oxygen, and inert gases, the nonoxygen constituents of air.

The proportion of air to be added in the autoclave, in relation to the cellulose, will vary widely with the reaction conditions used, the kind of ether being made, the viscosity of the cellulose and the required viscosity of the product. Amounts of air ordinarily will vary from a trace (about 0.001 cu. ft. air per pound cellulose) to about 1.26 cu. ft. air per pound of cellulose.

It is evident that the more air added under a given set of conditions, the lower the viscosity of the resulting cellulose ether. Elimination of all air from the autoclave, followed by etherification of the cellulose in the absence of any oxidizing gas, may give ethers having viscosities of 500,000 centipoises or even higher. Such ethers have relatively little commercial utility. By eliminating all air and then adding only .057 cu. ft. air per pound of cellulose and then etherifying, as shown in Example 1, the product is given a viscosity of only 393 centipoises. In other terms, by introducing 1.9 pounds of oxygen into one ton of linters and etherifying as shown in Example 1, the viscosity drops from about 500,000 to 393 centipoises. This illustrates the extreme sensitivity of the cellulose ethers, during their etherification, to the amount of oxygen present. Further, it illustrates the essence and utility of the present invention: Unexpected effectiveness of small amounts of oxygen at certain stages of preparation and successful predetermination of viscosity.

By constructing the semi-log graph as suggested in the paragraph following the previously presented table, the amounts of air necessary to reach a given product viscosity may be determined. It will be apparent to those skilled in the art that such a graph, constructed from the table, will apply only when the other etherification conditions described in Examples 1–4 are utilized. If the conditions are varied therefrom, for example, by using different etherification temperatures, a new semi-log graph will apply to the set of conditions used.

The present invention may be applied in the production of cellulose ethers having viscosities varying from about 4 to about 2000 centipoises. Lower viscosities than about 4 centipoises are not ordinarily obtained by using even excessive amounts of air, while viscosities higher than 2000 would find little commercial utility.

The addition of the oxidizing gas may be made at numerous stages in the process at any time after the withdrawal of the air initially present in the autoclave, such as prior to, during, or intermittently during etherification.

The stage at which control of the amount of oxidizing gas is most important is during the heat cycle of the etherification step. The exact reason for great sensitivity of ethyl cellulose during its formation to the amount of oxidizing gas present has not been ascertained. The heat cycle includes the period of heating to maximum temperature, the period of heating at the etherification temperature, and the cooling period.

Since all air is eliminated from the autoclave initially, the oxidizing gas subsequently placed therein will constitute the only gaseous oxidant which need be taken into consideration when adjusting the reaction conditions. The oxidizing gas may be measured before it enters the autoclave, such as by metering or by displacement from a graduated tank, as shown in Example 1. A third means of measuring the oxidizing gas is to calculate the amount from the increase in autoclave pressure, as shown in Example 2. This method is not as desirable, as metering during introduction of the oxidizing gas will give a more accurate result.

While the examples show the application of the invention to the manufacture of ethyl cellulose, other cellulose ethers may benefit by its use as well. Other cellulose ethers which may be prepared by the method according to this invention are alkyl ethers, such as methyl, propyl, or butyl ethers; aralkyl ethers, such as benzyl cellulose; carboxyalkyl celluloses, such as carboxymethyl cellulose and its salts; hydroxyalkyl celluloses, such as hydroxyethyl cellulose; alkylene ethers, such as allyl cellulose and mixed ethers, such as ethyl-butyl cellulose and methyl-propyl cellulose.

Other esterifying agents may be employed when carrying out the invention in addition to, or in place of, ethyl chloride shown in the examples. For example, other organic halides may be used, such as methyl chloride, ethyl bromide, or benzyl chloride. Alkyl sulfates are also employed at times. These include such compounds as dimethyl sulfate. Halogenated organic acids, such as chloracetic acid, may be used to produce the carboxyalkyl cellulose ethers and their salts. Halogen substitution products of polyhydric alcohols, such as ethylene chlorohydrin, may be employed in the preparation of the hydroxyalkyl cellulose, while alkylene halides, such as allyl chloride, are used to prepare thermosetting cellulose ethers.

While sodium hydroxide is the usual basic substance used in cellulose etherification, other alkali metal hydroxides, such as potassium hydroxide, may be used. Likewise, quaternary ammonium bases, such as tetramethyl ammonium hydroxide, may be utilized according to recently developed methods. The concentration of the basic substance is not material to the present invention, but usually will be equal to, or greater than, that of a 45% sodium hydroxide solution.

The source of the cellulose used in making cellulose ethers is immaterial to the operation of the present invention. Cotton linters are the preferred source, since highly purified cellulose can be obtained therefrom, but wood pulp or the various cellulosic grasses or other celluloses may be used alternatively.

This invention is useful in that cellulose ethers having viscosities closely approximating those of a given specification may be consistently prepared. It has the advantage over the prior art that control is much closer than was heretofore possible, and thereby the accidential preparation of ethyl celluloses having unsuitable viscosities for a particular purpose is avoided.

Where, in the specification, ethyl cellulose viscosities are given in terms of centipoises, it will be understood to mean the viscosity of a 5% solution in 80:20 toluene : alcohol at 25.0° C. Where, in the claims, the term "preparation of cellulose ethers" is used, it will mean all operations taking place in the autoclave, comprising alteration of cellulose viscosity, treatment of alkali cellulose, and the actual etherification step.

What I claim and desire to protect by Letters Patent is:

1. In a process in which cellulose, alkali, and an etherifying agent are heated and agitated together to produce a cellulose ether, the improvement which comprises incorporating a volatile liquid of the class consisting of ethyl chloride and volatile organic compounds of the class consisting of hydrocarbons, ethers and alcohols with the cellulose in a closed vessel, distilling off the volatile liquid in sufficient quantity to remove substantially all air from the cellulose and the vessel, adding to the vessel a measured amount of gas containing free oxygen, said oxygen being equivalent to the oxygen content in an amount of air between about 0.001 and about 1.26 cu. ft. per pound of cellulose and predetermined in quantity to give a cellulose ether of a desired viscosity, and etherifying the cellulose in said vessel in the presence of said measured amount of gas containing free oxygen without permitting further access of oxygen.

2. In a process in which cellulose, alkali, and an ethylating agent are heated and agitated together to produce ethyl cellulose, the improvement which comprises incorporating a volatile liquid of the class consisting of ethyl chloride and volatile organic compounds of the class consisting of hydrocarbons, ethers and alcohols with the cellulose in a closed vessel, distilling off the volatile liquid in sufficient quantity to remove substantially all air from the cellulose and the vessel, adding to the vessel a measured amount of gas containing free oxygen, said oxygen being equivalent to the oxygen content in an amount of air between about 0.001 and about 1.26 cu. ft. per pound of cellulose and predetermined in quantity to give an ethyl cellulose of a desired viscosity, and ethylating the cellulose in said vessel in the presence of said measured amount of gas containing free oxygen without permitting further access of oxygen.

3. In a process in which cellulose, alkali, and an ethylating agent are heated and agitated together to produce ethyl cellulose, the improvement which comprises incorporating a volatile liquid of the class consisting of ethyl chloride and volatile organic compounds of the class consisting of hydrocarbons, ethers and alcohols with the cellulose in a closed vessel, distilling off the volatile liquid in sufficient quantity to remove substantially all air from the cellulose and the vessel, adding to the vessel a measured amount of oxygen, said oxygen being equivalent to the oxygen content in an amount of air between about 0.001 and about 1.26 cu. ft. per pound of cellulose and predetermined in quantity to give an ethyl cellulose of a desired viscosity, and ethylating the cellulose in said vessel in the presence of said measured amount of oxygen without permitting further access of oxygen.

4. In a process in which cellulose, alkali, and an ethylating agent are heated and agitated together to produce ethyl cellulose, the improvement which comprises incorporating a volatile liquid of the class consisting of ethyl chloride and volatile organic compounds of the class consisting of hydrocarbons, ethers and alcohols with the cellulose in a closed vessel, distilling off the volatile liquid in sufficient quantity to remove substantially all air from the cellulose and the vessel, adding to the vessel an amount of air between 0.001 and 1.26 cubic feet per pound of the cellulose and predetermined in quantity to give an ethyl cellulose of a desired viscosity, and ethylating the cellulose in said vessel in the presence of said predetermined amount of air without permitting further access of oxygen.

5. In a process in which cellulose, alkali, and an ethylating agent are heated and agitated together to produce ethyl cellulose, the improvement which comprises incorporating ethyl ether with the cellulose in a closed vessel, distilling off the ethyl ether in sufficient quantity to remove substantially all air from the cellulose and the vessel, adding to the vessel a measured amount of gas containing free oxygen, said oxygen being equivalent to the oxygen content in an amount of air between about 0.001 and about 1.26 cu. ft. per pound of cellulose and predetermined in quantity to give an ethyl cellulose of a desired viscosity, and ethylating the cellulose in said vessel in the presence of said measured amount of gas containing free oxygen without permitting further access of oxygen.

6. In a process in which cellulose, alkali, and ethyl chloride are heated and agitated together to produce ethyl cellulose, the improvement which comprises incorporating ethyl chloride with the cellulose in a closed vessel, distilling off a sufficient quantity of the ethyl chloride to remove substantially all air from the cellulose and the vessel, adding a measured amount of gas containing free oxygen, said oxygen being equivalent to the oxygen content in an amount of air between about 0.001 and about 1.26 cu. ft. per pound of cellulose and predetermined in quantity to give an ethyl cellulose of a desired viscosity, and ethylating the cellulose in said vessel in the presence of said measured amount of gas containing free oxygen without permitting further access of oxygen.

7. In a process in which cellulose, alkali, and ethyl chloride are heated and agitated together to produce ethyl cellulose, the improvement which comprises incorporating ethyl ether with the cellulose in a closed vessel, distilling off a sufficient quantity of the ethyl ether to remove substantially all air from the cellulose and the vessel, adding an amount of air between 0.001 and 1.26 cubic feet per pound of the cellulose predetermined in quantity to give an ethyl cellulose of a desired viscosity, and ethylating the cellulose in said vessel in the presence of said predetermined amount of air without permitting further access of oxygen.

8. In a process in which cellulose, alkali, and ethyl chloride are heated and agitated together to produce ethyl cellulose, the improvement which comprises incorporating ethyl chloride with the cellulose in a closed vessel, distilling off a sufficient quantity of the ethyl chloride to remove substantially all air from the cellulose and the vessel, adding an amount of air between 0.001 and 1.26 cubic feet per pound of the cellulose predetermined in quantity to give an ethyl cellulose of a desired viscosity, and ethylating the cellulose in said vessel in the presence of said predetermined amount of air without permitting further access of oxygen.

ROBERT B. DARLING.

REFERENCES CITED

The following references are of record in the file of this patent:

UNITED STATES PATENTS

| Number | Name | Date |
| --- | --- | --- |
| 1,831,197 | Richter | Nov. 10, 1931 |
| 1,860,432 | Richter | May 31, 1932 |
| 2,137,343 | Maxwell | Nov. 22, 1938 |
| 2,160,107 | Maxwell et al. | May 30, 1939 |
| 2,340,177 | Dreyfus | Jan. 25, 1944 |
| 2,362,900 | Groombridge et al. | Nov. 14, 1944 |
| 2,381,972 | Dreyfus | Aug. 14, 1945 |

OTHER REFERENCES

Ott: "Cellulose and its Derivatives" Interscience Publishers, Inc., New York, N. Y., 1943, pp. 740–742.

Certificate of Correction

Patent No. 2,492,524                                                          December 27, 1949

ROBERT B. DARLING

It is hereby certified that errors appear in the printed specification of the above numbered patent requiring correction as follows:

Column 2, lines 37 and 38, for the word "esterification" read *etherification*; column 5, line 30, for "esterifying" read *etherifying*; line 43, for "cellulose" read *celluloses*;

and that the said Letters Patent should be read with these corrections therein that the same may conform to the record of the case in the Patent Office.

Signed and sealed this 2nd of May, A. D. 1950.

[SEAL]

THOMAS F. MURPHY,
*Assistant Commissioner of Patents.*